US009574696B2

(12) United States Patent
Aus

(10) Patent No.: US 9,574,696 B2
(45) Date of Patent: Feb. 21, 2017

(54) STEPPED LOAD PULL BACK USING RAMS

(71) Applicant: Earth Tool Company LLC, Oconomowoc, WI (US)

(72) Inventor: Kelvin C. Aus, Watertown, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 111 days.

(21) Appl. No.: 14/206,548

(22) Filed: Mar. 12, 2014

(65) Prior Publication Data

US 2014/0270970 A1    Sep. 18, 2014

Related U.S. Application Data

(60) Provisional application No. 61/779,474, filed on Mar. 13, 2013.

(51) Int. Cl.
*F16L 55/00*    (2006.01)
*F16L 55/165*    (2006.01)

(52) U.S. Cl.
CPC .................................. *F16L 55/1658* (2013.01)

(58) Field of Classification Search
CPC ........................................................ F15B 11/036
USPC ....................................... 405/184.3; 254/29 R
See application file for complete search history.

(56) References Cited

U.S. PATENT DOCUMENTS

| | | | | |
|---|---|---|---|---|
| 2,352,390 A | * | 6/1944 | Kirkland | .......................... 60/475 |
| 4,473,329 A | * | 9/1984 | Aoshima | ................ B23Q 11/04 |
| | | | | 408/11 |
| 4,662,606 A | * | 5/1987 | Akesaka | ..................... 254/29 R |
| 5,785,458 A | | 7/1998 | Handford | |
| 7,329,070 B1 | * | 2/2008 | Trent | .................... E21B 19/006 |
| | | | | 405/224.4 |

* cited by examiner

*Primary Examiner* — Tara M. Pinnock
(74) *Attorney, Agent, or Firm* — Tomlinson McKinstry, P.C.

(57) ABSTRACT

A thrust apparatus for a rod string. The apparatus has a stationary frame, a thrust frame with a rod gripper, two hydraulic cylinders and two rams in fluid communication with the hydraulic cylinders. During low-load operations, the hydraulic cylinders act alone, providing the load to the grippers to pull or push the rod string. When higher loads are required, a check valve is activated, allowing fluid from the hydraulic cylinders to activate the rams. The rams provide additional force to the grippers, and may be activated without mechanical or significant hydraulic changes to the apparatus.

24 Claims, 4 Drawing Sheets

US 9,574,696 B2

STEPPED LOAD PULL BACK USING RAMS

CROSS REFERENCE TO RELATED APPLICATION

This application claims the benefit of provisional patent application Ser. No. 61/779,474, filed on Mar. 13, 2013, the entire contents of which are incorporated herein by reference.

FIELD

The present invention relates generally to a hydraulically actuated pipe-bursting apparatus.

BACKGROUND

Threaded pipe or rod strings are used in horizontal installations for trenchless technology applications, particularly pipe bursting. High tensile loads are applied to pipe strings which pull bursting tooling through existing pipelines to facilitate replacement with a new product pipe. During push-out, the process of assembling the rod string from individual rods and pushing the assembled string through an existing host pipe takes a modest amount of thrust. During pullback, the portion of the process wherein the pipe is cracked and the surrounding soil is expanded, the load will be higher than during push-out. Variation in job size, host pipe material and adjacent soils all affect the maximum tensile load applied to the rod string.

To produce the tensile and thrust loads on the rod string, multiple hydraulic cylinders are often used as they provide an efficient means for producing large loads. These cylinders are part of a downhole device used to thrust, pull, assemble and disassemble said rod string. Further, these cylinders are actuated by hydraulics delivered by a hydraulic pump, most often turned by a gasoline or diesel engine.

SUMMARY

The present invention is directed to an apparatus for pulling and pushing a rod string. The apparatus comprises a stationary frame, a thrust frame, a hydraulic cylinder, and a ram. The thrust frame comprises a gripper engageable with the rod string. The hydraulic cylinder comprises an extendable rod attached at a first end to the thrust frame and at a second end to the stationary frame. The hydraulic cylinder provides extension force between the thrust frame and the stationary frame. The ram is attached at a first end to the thrust frame and is not attached to the stationary frame. The ram comprises an extendable ram rod at a second end. The ram is in fluid communication with the hydraulic cylinder in a first condition is not in fluid communication with the hydraulic cylinder in a second condition. The extendable ram rod provides extension force between the thrust frame and the stationary frame when in the first condition.

DESCRIPTION

Figure 1:
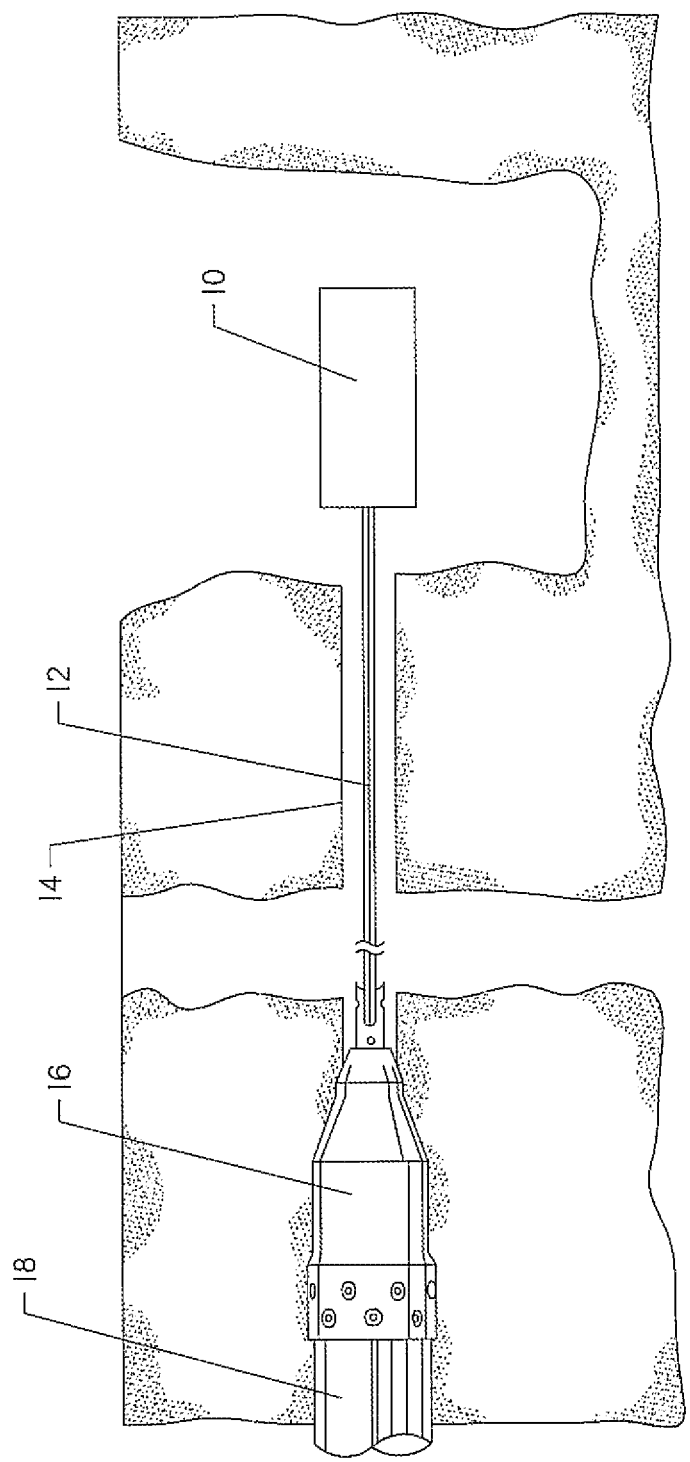
FIG. 1 is a side view of a pipe bursting operation.

FIG. 1 shows a rod pushing/pulling machine generally referred to herein as a thrust unit 10 intended for pipe bursting. The thrust unit 10 is connected to a rod string 12 for pushing into an existing pipe 14 and pulling back a pipe splitter 16 and a new pipe 18. The rod string 12 may be threaded, or may be hooked together from rod sections by turning or fitting pipe sections together. One skilled in the art will appreciate that the process of pushing the rod 12 into the existing pipe 14 will require less thrust than pulling back the splitter 16 and new pipe 18 for pipe bursting purposes.

Figure 2:
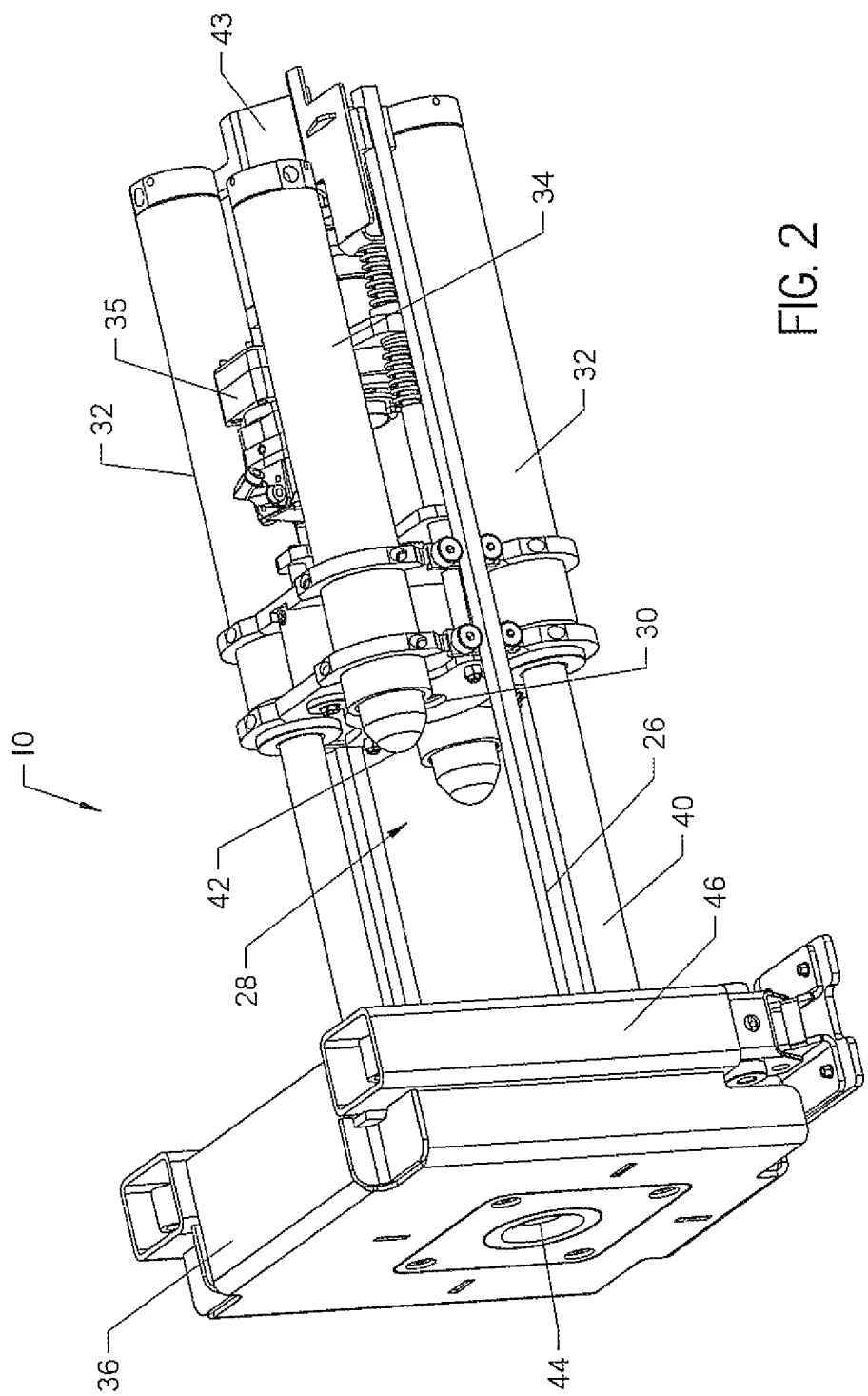
FIG. 2 is a perspective view of a rod pushing/pulling machine incorporating hydraulic thrust cylinders and hydraulic rams.

With reference now to FIG. 2, a detailed view of the thrust unit 10 is shown with the rod string 12 removed for clarity. The thrust unit 10 comprises a rail 26, a thrust frame 28, a gripper 30, two cylinders 32, two rams 34, a rod spinner 35 and a stationary frame 36. The thrust frame 28 is movable along the rail 26 relative to the stationary frame 36. The thrust frame 28 supports the gripper 30, the two cylinders 32, two rams 34 and rod spinner 35. As shown, the thrust frame 28 comprises wheels 38 for interaction with the rail 26. One of ordinary skill will appreciate that rack-and-pinion, pulley, or other systems are appropriate for movement of the thrust frame 28 relative to the stationary frame 36. Further, the thrust unit 10 may be operable with different numbers of cylinders 32 and rams 34. Two cylinders 32 and rams 34 are chosen for convenience in the figures and are not limiting on this invention.

The gripper 30 may comprise collets, jaws, or any other gripping mechanism suitable for producing gripping forces for pulling and pushing the rod string. As shown, the gripper 30 comprises a slip bowl. The gripper 30 travels toward and away from the stationary frame 36 as the thrust frame 28 moves along the rail 26. The cylinders 32 are connected on a first end to the gripper 30 and on a second end to the stationary frame 36. Each cylinder 32 comprises a cylinder rod 40. The cylinder rods 40 are movable between a retracted and extended position in response to flow of hydraulic fluid to and from the cylinders 32. As shown, cylinder rods 40 of the cylinders 32 are in the extended position. The cylinders 32 expand and retract to increase or decrease the distance between the stationary frame 36 and the thrust frame 28, causing the grippers 30 to push out or pull back the rod string. As shown, the cylinders 32 are diagonally disposed about the gripper 30 and therefore the rod string.

With continued reference to FIG. 2, the rams 34 provide additional pull back load when the thrust of cylinders 32 alone is insufficient. The rams 34 comprise a contact surface or thrust nose 42 for contacting the stationary frame 36. As shown, the thrust nose 42 is a rounded nose, though a flat end or other configuration may be used. The rams 34 are hydraulically actuated and mechanically retracted cylinders moveable between a retracted and extended position in response to the flow of hydraulic fluid. The rams 34 are attached at a first end to the thrust frame 28 but not attached to the stationary frame 36.

The rams 34 are further adjustable between an activated and inactive condition. When in the activated condition, the rams 34 will extend and retract in concert with the cylinders 32. When extended, the thrust nose 42 of the rams 34 will contact the stationary frame 36 to provide hydraulic thrust to the grippers 30, additive of that provided by the cylinders 32.

When in the inactive condition, the rams 34 do not extend and retract. One of ordinary skill will appreciate that it is desirable to have the cylinder rod 40 of the cylinders 32 and the thrust nose 42 of the rams 34 in the direction of the existing pipe 14 (FIG. 1) so that "pulling" forces on the rod string 12 (FIG. 1) receive the force associated with expanding the cylinders and rams.

The rod spinner 35 threads on or off sections of the rod string 12 (FIG. 1) to make up or break out the rod string (FIG. 1) during pushing or pulling operations. The rod spinner 35 may alternatively connect sections of the rod string without threading, if unthreaded sections are utilized. A rod support frame 43 travels with the thrust frame 28 and maintains alignment between a rod section about to be added or a newly removed rod section.

The stationary frame 36 is a stationary reaction plate to allow the extension of the cylinders 32 to cause the thrust frame 28 to pull or push the rod string. The stationary frame 28 comprises a central aperture 44 and jacks 46. The rod string 12 (FIG. 1) travels through the central aperture and through the grippers 30 of the thrust frame 28. Jacks 46 may be utilized to stabilize the stationary frame 36 to the ground such that the operation of the thrust unit 10 does not cause excessive movement in the stationary frame.

Figure 3:
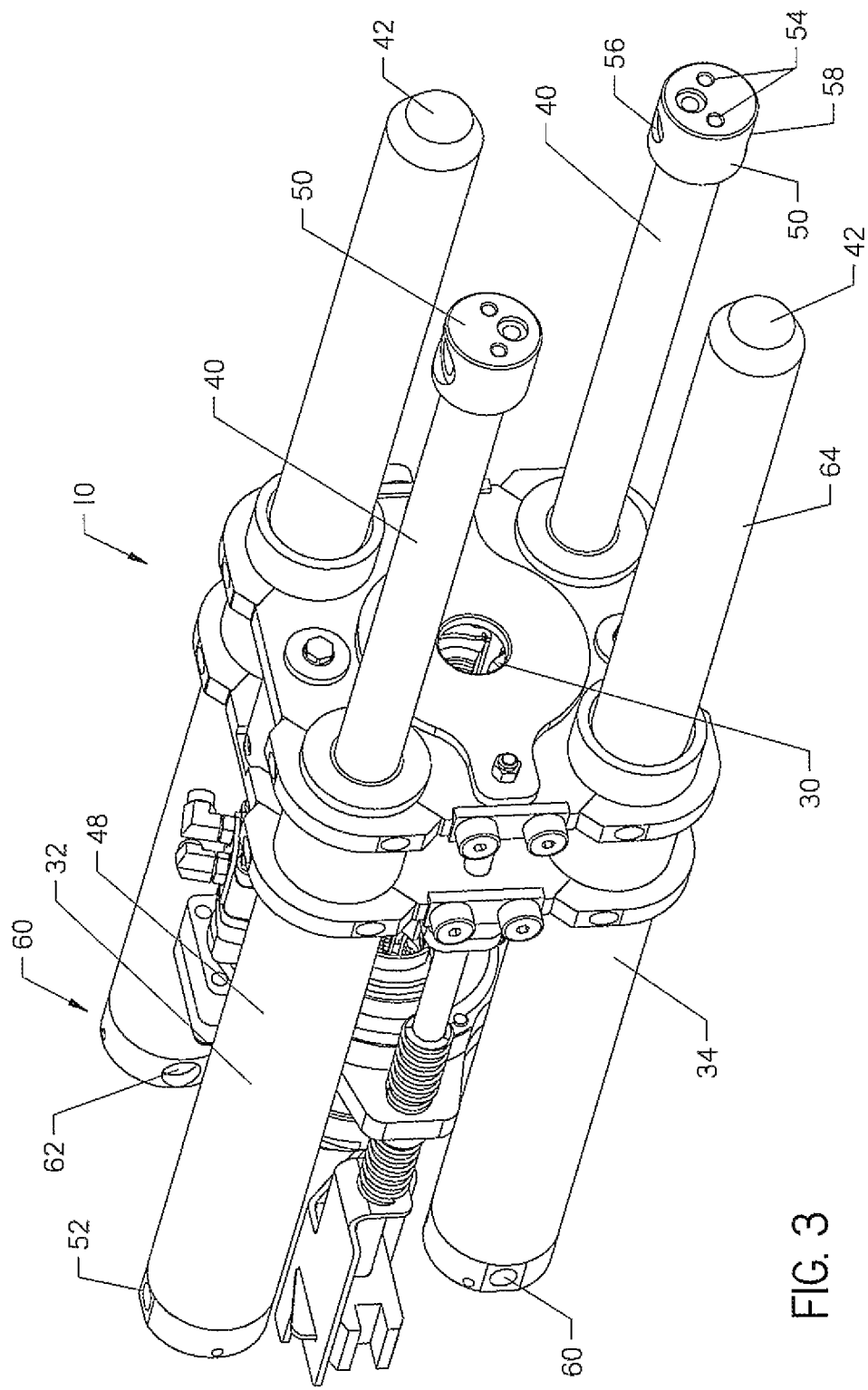
FIG. 3 is a perspective view of the primary thrusting/pulling mechanism on a pipe bursting machine with the cylinders and rams extended.

With reference now to FIG. 3, the thrust unit 10 is shown without the stationary frame 36 and track rail 26. The cylinders 32 comprise the cylinder rods 40, a cylinder body 48, a rod boss 50, and hydraulic fluid outlet port 52. The rod boss 50 comprises a stationary frame connection 54, a retraction port 56, and an extension port 58. The stationary frame connection 54, as shown, is a threaded connection between the cylinder rod 40 of the cylinder 32 and the stationary frame 36 (FIG. 2). Other connections between the rod boss 50 and the reaction plate are known in the art and anticipated alternatives thereof. The retraction port 56 provides a location for inserting hydraulic fluid into the cylinders 32 such that the cylinder rods 40 are forced to retract into the cylinder body 48. The extension port 58 provides a location for inserting hydraulic fluid into the cylinders 32 such that the cylinder rods are forced to extract from the cylinder body 48. The hydraulic fluid outlet port 52 delivers pressurized hydraulic fluid from the cylinder body 48 of the hydraulic cylinders 32 to the rams 34.

The rams 34 comprise an inlet port 60, a recess 62, and a ram rod 64. As shown in FIG. 3, the rams 34 are in the activated condition. As shown, the ram rod 64 is fully extended such that the thrust nose 42 contacts the reaction plate 34 (FIG. 2). Inlet port 60 communicates with recess 62 to create a cavity for a pilot operated check valve (not shown) which permits the rams 34 to be toggled between the activated condition and the inactive condition at the direction of an operator.

In operation, as shown in FIG. 3, hydraulic fluid has entered the extension port 58 causing the rod 40 to extend from the cylinder body 48. Fluid leaves the cylinder 32 via hydraulic fluid outlet port 52 and enters the rams 34 through inlet port 60. Because the rams 34 are extended, it is apparent that the pilot operated check valve within the recess 62 is open, allowing the ram rod 64 to extend. As all hydraulic components are in actuation, maximum load is achieved, though the cost of full load is that the thrust unit 10 may operate at lower extension speed than if just the two cylinders 32 are actuated alone. The rams 34 may be placed in the inactive condition by closing the check valve within the recess 62 causing fluid to bypass the rams. Such a condition as shown in FIG. 2.

With continued reference to FIG. 3, ram rods 64 retract when hydraulic fluid is provided to the retraction port 56 of the hydraulic cylinders 32. Fluid provided to the retraction port 56 causes the rod 40 to retract into the cylinder body 48, forcing the thrust frame 28 and stationary frame 36 together. The stationary frame 36 (FIG. 2) contacts the contact surface 42 of the ram rods 64, causing the rams 34 to mechanically retract and hydraulic fluid to leave the rams 34 through the inlet port 60.

Figure 4:
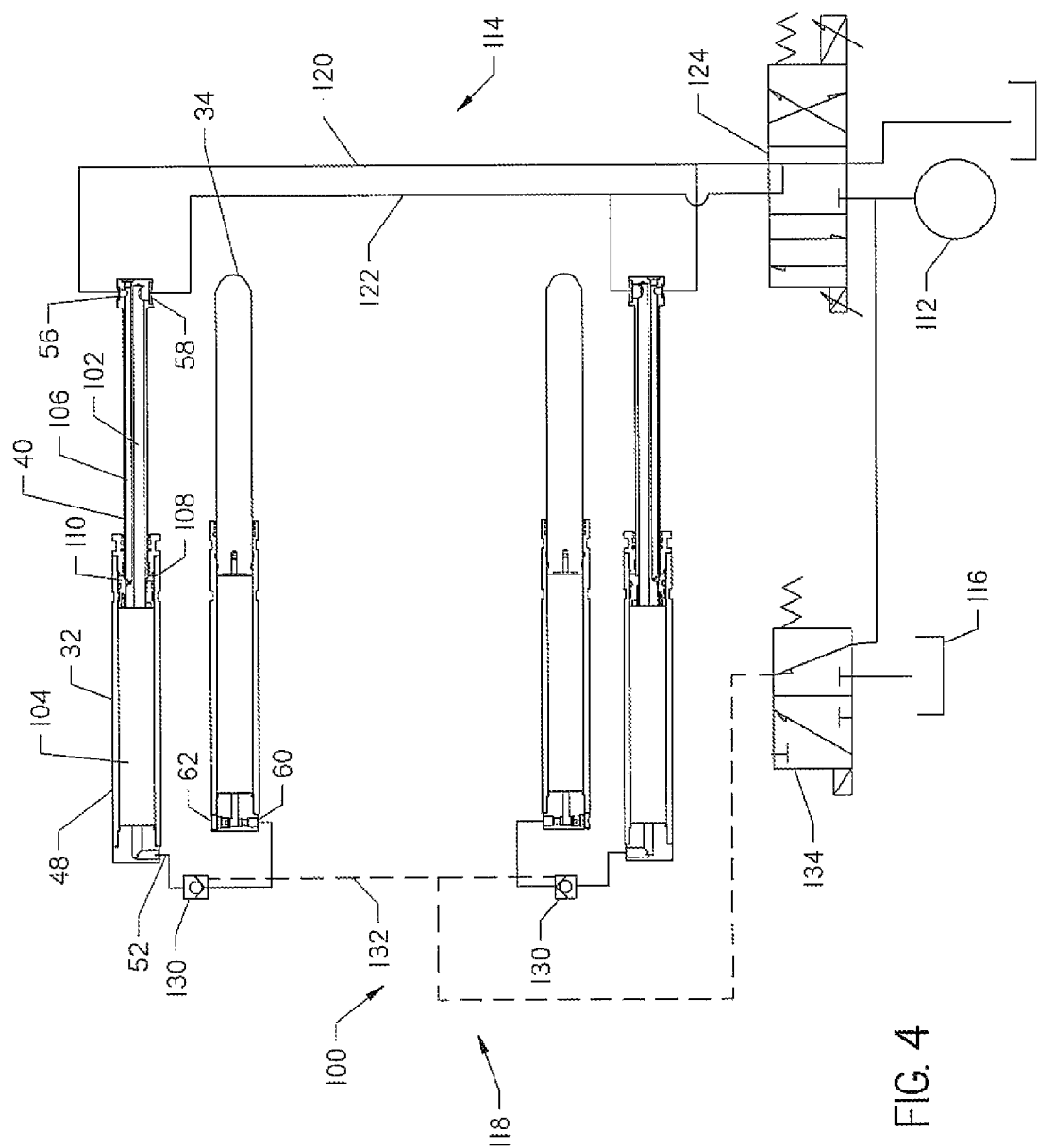
FIG. 4 is a partial schematic and a partial section view of thrusting rams and cylinders.

With reference to FIG. 4, the cylinders 32 and rams 34 are shown in cross-section with a diagrammatic representation of a hydraulic control system 100. Extension port 58 communicates through piston passage 102 with piston volume 104. Retraction port 56 communicates through rod passage 106 with rod volume 108. The cylinder body 48 is attached to the rod 40 of the cylinders 32 at a gland 110. When hydraulic fluid is provided at retraction port 56, the volume of the rod volume 108 expands, causing the rod 40 to retract. Likewise, when hydraulic fluid is provided at extension port 58, the volume of the piston volume 104 increases, causing the rod 40 to extend. Pressure is provided to the gland 110, which comprises various elastic seals to facilitate pressurization of the hydraulic cylinder 32.

The hydraulic control system 100 comprises a pump 112, a fluid supply system 114, at least one hydraulic fluid tank 116 and a pilot valve system 118. The pump 112 pressurizes hydraulic fluid in the tank 116 such that it is forced into the hydraulic control system 100 for operating the thrust tool 10. The fluid supply system comprises a first hose 120, a second hose 122, and a cylinder control valve 124. The first hose 120 provides fluid to the retraction port 56. The second hose 122 provides fluid to the extension port 58. The cylinder control valve toggles between providing pressurized fluid to the hoses 120, 122 so that expansion and retraction of the cylinders 32 may be alternated.

The pilot valve system 118 comprises a check valve 130, a fluid pilot hose 132, and a fluid valve 134. Hydraulic fluid outlet port 52 connects via fluid hoses to the check valve 120. The check valve 130 may be integrally located within the ram 34 or located outside the rain as shown in FIG. 4. Pilot pressure to produce an open check valve 130 condition and therefore an activated ram 34 condition is provided through the fluid pilot hose 132. Fluid valve 134 controls pilot pressure within the check valve 130 such that the rams 34 may be toggled between an inactive and an activated condition. When in the activated position, hydraulic fluid will enter the ram through inlet port 60, causing extension of the ram rod 64, and will exit the ram through the inlet port upon retraction of the cylinders 32. When in the inactive position, hydraulic fluid will not enter the ram 34. However, when in the inactive position, check valve 130 will allow hydraulic fluid to pass out of the rams 34 into the hydraulic cylinder 32 when the rams are mechanically retracted. Fluid valve 134 may be manually or electrically manipulated by an operator to place the rams 34 in the activated or the inactive condition as desired for operation of the thrust unit 10. Additionally, fluid valve 134 may be manipulated by signals from a load sensor (not shown) that indicates that less thrust is acceptable, or that more thrust is required for operation of the thrust unit 10.

Various modifications can be made in the design and operation of the present invention without departing from the spirit thereof. Thus, while the principle preferred construction and modes of operation of the invention have been explained in what is now considered to represent its best embodiments, which have been illustrated and described, it should be understood that the invention may be practiced otherwise than as specifically illustrated and described.

What is claimed is:

1. An apparatus for pulling a rod string comprising:
   a stationary frame;
   a thrust frame comprising a gripper engageable with the rod string;
   a hydraulic cylinder comprising an extendable rod attached at a first end to the thrust frame and at a second end to the stationary frame wherein the hydraulic cylinder provides extension force between the thrust frame and the stationary frame; and
   a ram attached at a first end to the thrust frame and not attached to the stationary frame, the ram comprising an extendable ram rod at a second end, wherein when the ram is in a first condition it is in fluid communication with the hydraulic cylinder and when the rain is in the second condition it is not in fluid communication with the hydraulic cylinder;
   wherein the extendable rain rod provides extension force between the thrust frame and the stationary frame when in the first condition; and
   wherein the ram rod is extendable to engage the stationary frame.

2. The apparatus of claim 1 further comprising a check valve such that activation of the check valve places the ram in the first condition.

3. The apparatus of claim 2 further comprising an electric actuator for deactivating the check valve.

4. The apparatus of claim 1 further comprising a second hydraulic cylinder.

5. The apparatus of claim 1 further comprising a second ram.

6. The apparatus of claim 5 further comprising a second hydraulic cylinder, wherein the second ram is in fluid communication with the second hydraulic cylinder in a first condition and wherein the second rain is not in fluid communication with the second hydraulic cylinder in a second condition.

7. The apparatus of claim 6 further comprising a check valve such that activation of the check valve places the ram and the second ram in the first condition.

8. The apparatus of claim 1 wherein the gripper comprises a slip bowl.

9. The apparatus of claim 1 wherein extension force is provided between the thrust frame and the stationary frame when the ram is not extended.

10. An apparatus for pulling a rod string comprising:
    a stationary frame;
    a thrust frame having a gripper for gripping and releasing the rod string, wherein the thrust frame is movable relative to the stationary frame;
    a first hydraulic cylinder attached to and extending between the stationary frame and the thrust frame comprising a retraction port, an extension port, and a fluid exit;
    a first hydraulic ram attached to the thrust frame comprising an inlet port and comprising an extendable ram rod;
    a valve operable in a first and a second condition, wherein the valve allows fluid communication between the inlet port of the first hydraulic ram and the fluid exit of the first hydraulic cylinder when in the first condition and wherein the valve does not allow fluid communication between the inlet port of the first hydraulic ram and the fluid exit of the first hydraulic cylinder when in the second condition; and
    a pump for providing fluid to the extension port and the retraction port;
    wherein the first hydraulic cylinder retracts when fluid is provided by the pump to the retraction port and extends when fluid is provided by the pump to the extension port; and
    wherein the first hydraulic ram extends and contacts the stationary frame when fluid is provided by the pump to the extension port of the hydraulic cylinder and the valve is in the first condition; and
    wherein the first hydraulic ram is mechanically retracted through contact with the stationary frame when the first hydraulic cylinder is retracted.

11. The apparatus of claim 10 further comprising:
    a second hydraulic cylinder; and
    a second hydraulic ram in fluid communication with the second hydraulic cylinder when the valve is in the first condition.

12. The apparatus of claim 11 wherein the first hydraulic cylinder and second hydraulic cylinder are diagonally disposed about the gripper.

13. The apparatus of claim 10 wherein the valve is electrically actuated.

14. The apparatus of claim 10 further comprising a rail fixed to the stationary frame wherein the thrust frame is movably mounted on the rail.

15. The apparatus of claim 14 wherein the rail comprises a rack and pinion.

16. The apparatus of claim 10 further comprising a load sensor for identifying when additional thrust is required and activating the valve.

17. The apparatus of claim 10 wherein the thrust frame is moved relative to the stationary frame without providing fluid to the inlet port of the first hydraulic ram.

18. A method for installing a utility line using an apparatus for pulling a rod string comprising a thrust frame comprising a gripper, a stationary frame, a hydraulic cylinder disposed between the stationary frame and the thrust frame, and a ram comprising a ram rod extendable to engage the stationary frame in fluid communication with the hydraulic cylinder when a valve is activated, the method comprising:
    placing the rod within the gripper;
    pushing the rod through an existing pipe;
    attaching a pipe burster to a distal end of the rod;
    gripping a proximate end of the rod with the gripper;
    extending the hydraulic cylinder without extending the ram to pull the pipe burster toward the stationary frame;
    releasing the rod with the gripper;
    retracting the hydraulic cylinder;
    gripping the proximate end of the rod with the gripper; and
    extending the hydraulic cylinder without extending the ram to pull the pipe burster toward the stationary frame.

19. The method of claim 18 further comprising:
    activating the valve when additional force is needed;
    gripping the proximate end of the rod with the gripper;
    extending the hydraulic cylinder and ram rod to pull the pipe burster toward the stationary frame;
    releasing the rod with the gripper; and
    retracting the hydraulic cylinder.

20. The method of claim 19 further comprising providing a second cylinder and a second ram, such that the second ram is in fluid communication with the second cylinder when the valve is activated.

21. The method of claim 18 further comprising:
releasing the rod with the gripper; and
retracting the hydraulic cylinder.

22. The method of claim 18 wherein the valve is electrically actuated.

23. The method of claim 18 wherein the ram is mechanically retracted by retracting the hydraulic cylinder and causing the stationary frame to contact the ram rod.

24. An apparatus for pulling rod string comprising:
- a stationary frame;
- a thrust frame comprising a gripper engageable with the rod string;
- a hydraulic cylinder comprising an extendable rod attached at a first end to the thrust frame and at a second end to the stationary frame wherein the hydraulic cylinder provides extension force between the thrust frame and the stationary frame; and
- a ram attached at a first end to the thrust frame and not attached to the stationary frame, the ram comprising an extendable ram rod at a second end, wherein when the ram is in a first condition it is in fluid communication with the hydraulic cylinder and when the ram is in the second condition it is not in fluid communication with the hydraulic cylinder;
- wherein the extendable ram rod provides extension force between the thrust frame and the stationary frame when in the first condition; and
- wherein the extendable ram rod is mechanically retracted through contact with the stationary frame when the extendable rod of the hydraulic cylinder is retracted.

* * * * *

UNITED STATES PATENT AND TRADEMARK OFFICE
CERTIFICATE OF CORRECTION

PATENT NO. : 9,574,696 B2  
APPLICATION NO. : 14/206548  
DATED : February 21, 2017  
INVENTOR(S) : Kelvin C Aus Page 1 of 1

It is certified that error appears in the above-identified patent and that said Letters Patent is hereby corrected as shown below:

In the Specification

Column 4, Line 41, please delete "rain" and substitute therefore --ram--.

In the Claims

Column 5, Line 17, Claim 1, please delete "rain" and substitute therefore --ram--.

Column 5, Line 20, Claim 1, please delete "rain" and substitute therefore --ram--.

Column 5, Line 37, Claim 6, please delete "rain" and substitute therefore --ram--.

Signed and Sealed this  
Eleventh Day of April, 2017

Michelle K. Lee  
*Director of the United States Patent and Trademark Office*